(12) United States Patent
Pratley (10) Patent No.: US 11,098,766 B2
(45) Date of Patent: Aug. 24, 2021

(54) ELASTOMER SERIES COUPLING DAMPER FOR SUPERCHARGER

(71) Applicant: Eaton Intelligent Power Limited, Dublin (IE)

(72) Inventor: Mark Harold Pratley, Marshall, MI (US)

(*) Notice: Subject to any disclaimer, the term of this patent is extended or adjusted under 35 U.S.C. 154(b) by 578 days.

(21) Appl. No.: 16/058,147

(22) Filed: Aug. 8, 2018

(65) Prior Publication Data

US 2018/0347661 A1 Dec. 6, 2018

Related U.S. Application Data

(63) Continuation of application No. PCT/US2016/047348, filed on Aug. 17, 2017.

(Continued)

(51) Int. Cl.
*F16D 3/78* (2006.01)
*F02B 33/38* (2006.01)
(Continued)

(52) U.S. Cl.
CPC ............. *F16D 3/78* (2013.01); *F02B 33/38* (2013.01); *F16D 3/12* (2013.01); *F16F 15/124* (2013.01)

(58) Field of Classification Search
CPC .......... F02B 33/38; F02B 39/12; F02B 39/16; F04C 18/26; F04C 23/006; F04C 29/005;
(Continued)

(56) References Cited

U.S. PATENT DOCUMENTS 1,626,195 A * 4/1927 Hiller .................. F16D 3/78
464/95
1,814,836 A * 7/1931 Lederman ............ H01R 33/02
464/105
(Continued)

FOREIGN PATENT DOCUMENTS

CN 2166259 5/1994
CN 2330812 7/1999
(Continued)

OTHER PUBLICATIONS

International Search Report and Written Opinion for International Application No. PCT/US2016/047348 dated Nov. 24, 2016, 9 pages.
(Continued)

*Primary Examiner* — Josh Skroupa
(74) *Attorney, Agent, or Firm* — RMCK Law Group PLC (57) ABSTRACT

A coupling assembly arranged between an input shaft and a rotor shaft of a supercharger includes a first hub, a second hub, a first side coupling assembly, a second side coupling assembly, a central hub and a plurality of coupler pins. The first hub is mounted for concurrent rotation with the input shaft. The second hub is mounted for concurrent rotation with the rotor shaft. The first side coupling assembly has a first side coupling body and a first side elastomeric insert. The first side coupling body includes an inboard body portion having a first series of pockets and an outboard body portion having a second series of pockets. The first side elastomeric insert has a first and second plurality of lobes. The pockets of the first and second series of pockets are tangentially offset relative to each other and each receive respective first and second plurality of lobes therein.

20 Claims, 10 Drawing Sheets

Related U.S. Application Data (60) Provisional application No. 62/292,536, filed on Feb. 8, 2016, provisional application No. 62/375,619, filed on Aug. 16, 2016.

(51) Int. Cl.
*F16D 3/12* (2006.01)
*F16F 15/124* (2006.01)

(58) Field of Classification Search
CPC ..... F16D 3/12; F16D 3/48; F16D 3/70; F16D 3/72; F16D 3/725; F16D 3/74; F16D 3/78
USPC ..................................................... 464/93–96
See application file for complete search history.

(56) References Cited

U.S. PATENT DOCUMENTS

| | | | | |
|---|---|---|---|---|
| 2,181,888 A | * | 12/1939 | Gustin | F16D 3/60 |
| | | | | 464/69 |
| 2,535,338 A | * | 12/1950 | Wilcox | F16D 3/04 |
| | | | | 464/95 |
| 2,595,393 A | * | 5/1952 | Langdon | F16D 3/50 |
| | | | | 464/72 |
| 2,727,369 A | * | 12/1955 | Fawick | F16D 3/70 |
| | | | | 464/72 |
| 3,626,767 A | * | 12/1971 | Wilde | F16D 3/50 |
| | | | | 464/93 |
| 6,325,722 B1 | | 12/2001 | Ciotola | |
| 7,235,014 B2 | * | 6/2007 | Gilbert | F16D 3/78 |
| | | | | 464/93 |
| 9,586,609 B2 | * | 3/2017 | Linke | F16D 3/78 |
| 2007/0193015 A1 | | 8/2007 | Gilbert | |

FOREIGN PATENT DOCUMENTS

| | | | | |
|---|---|---|---|---|
| CN | 201269132 | | 7/2009 | |
| CN | 103993953 A | | 8/2014 | |
| CN | 104110280 A | | 10/2014 | |
| CN | 104653281 A | | 5/2015 | |
| DE | 1909213 A1 | * | 9/1970 | ............... F16D 3/78 |
| EP | 173814 A1 | * | 3/1986 | ............... F16D 3/79 |
| JP | H05263649 A | | 10/1993 | |
| JP | H09264330 A | | 10/1997 | |
| JP | 2010203469 A | | 9/2010 | |
| WO | 2015126888 A1 | | 8/2015 | |

OTHER PUBLICATIONS

Chinese Office Action for CN Application No. 201680083863.7 dated May 7, 2020.

* cited by examiner

ELASTOMER SERIES COUPLING DAMPER FOR SUPERCHARGER

CROSS-REFERENCE TO RELATED APPLICATIONS

This application is a continuation of International Application No. PCT/US2016/047348 filed Aug. 17, 2017, which claims the benefit of U.S. Patent Application No. 62/292,536 filed on Feb. 8, 2016 and U.S. Patent Application No. 62/375,619 filed on Aug. 16, 2016. The disclosures of the above applications are incorporated herein by reference.

FIELD

The present disclosure relates generally to superchargers and more particularly to a coupling between an input shaft and a rotor shaft on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

In some examples, superchargers such as the Roots-type blower can create unwanted noise. For example, Roots-type blower noise may be classified as either of two types. The first is solid borne noise caused by rotation of timing gears and rotor shaft bearings subjected to fluctuating loads (the firing pulses of the engine), and the second is fluid borne noise caused by fluid flow characteristics, such as rapid changes in fluid (air) velocity. The present disclosure is primarily directed toward the solid borne noise. More particularly the present disclosure can minimize the "bounce" of the timing gears during times of relatively low speed operation, when the blower rotors are not "under load". In this regard, it is important to isolate the fluctuating input to the supercharger from the timing gears. In other examples it is desirable to account for misalignment and/or runout between the input shaft and rotor shaft. In some operating conditions, decoupling the supercharger inertia from the belt system can help reduce unwanted noise generated in the belt system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A coupling assembly arranged between an input shaft and a rotor shaft of a supercharger includes a first hub, a second hub, a first side coupling assembly, a second side coupling assembly, a central hub and a plurality of coupler pins. The first hub is mounted for concurrent rotation with the input shaft. The second hub is mounted for concurrent rotation with the rotor shaft. The first side coupling assembly has a first side coupling body and a first side elastomeric insert. The first side coupling body includes an inboard body portion and an outboard body portion. The inboard body portion has a first series of pockets. The outboard body portion has a second series of pockets. The first side elastomeric insert has a first and second plurality of lobes. The pockets of the first and second series of pockets are tangentially offset relative to each other and each receive respective first and second plurality of lobes therein. The second side coupling assembly has a second side coupling body and a second side elastomeric insert. The second side coupling body includes an inboard body portion and an outboard body portion. The inboard body portion has a third series of pockets. The outboard body portion has a fourth series of pockets. The second side elastomeric insert has a third and fourth plurality of lobes. The pockets of the third and fourth series of pockets are tangentially offset relative to each other and each receive respective third and fourth lobes therein. The central hub is disposed intermediate the first and second side coupling assemblies. The central hub defines central hub bores therein. The plurality of coupler pins are received in the central hub bores and extend on one end into the first plurality of lobes and on a second end into the third plurality of lobes. The first and second side elastomeric inserts provide dampening between (i) the first side coupling body and the central hub and (ii) the second side coupling body and the central hub.

According to additional features, the first hub is configured to couple between the input shaft and the first side coupling assembly. The first hub has a first plurality of hub pins extending therefrom. The second hub is configured to couple between the rotor shaft and the second side coupling assembly. The second hub has a second plurality of hub pins extending therefrom. The central hub further defines arcuate passages formed therein and configured to at least partially receive the first hub pins and the second hub pins.

According to other features, the first side coupling body defines a plurality of passages having an oval shape and the first side elastomeric insert defines a plurality of openings having a circular shape. The second side coupling body defines a plurality of passages having an oval shape and the second side elastomeric insert defines a plurality of openings having a circular shape. The plurality of coupler pins and the first plurality of hub pins are permitted to travel within the boundary of the oval passages in the first side coupling body while the first side elastomeric insert absorbs torsional loads. The plurality of coupler pins and the second plurality of hub pins are permitted to travel within the boundary of the oval passages in the second side coupling body while the second side elastomeric insert absorbs torsional loads. The first and second side elastomeric inserts can be formed of molded rubber such as hydrogenated nitrile butadiene rubber (HNBR). The first and second side coupling bodies are formed of one of Polyether ether ketone (PEEK) and glass-filled molded nylon such as Nylon 46 with 30% glass fiber.

A coupling assembly according to another example of the present disclosure is arranged between an input shaft and a rotor shaft of a supercharger includes a first side coupling assembly, a second side coupling assembly, a central hub and a plurality of coupler pins. The first side coupling assembly has a first side coupling body and a first side elastomeric insert. The first side coupling body includes an inboard body portion and an outboard body portion. The inboard body portion has a first series of pockets and a first series of passages. The outboard body portion has a second series of pockets and a second series of passages. The first side elastomeric insert has a first and second plurality of lobes. The pockets of the first and second series of pockets are tangentially offset relative to each other and each receive respective first and second plurality of lobes therein. The second side coupling assembly has a second side coupling body and a second side elastomeric insert. The second side coupling body includes an inboard body portion and an outboard body portion. The inboard body portion has a third series of pockets and a third series of passages. The outboard body portion has a fourth series of pockets and a fourth series of passages. The second side elastomeric insert has a third and fourth plurality of lobes. The pockets of the third and fourth series of pockets are tangentially offset relative to each other and each receive respective third and fourth lobes therein. The central hub is disposed intermediate the first and second side coupling assemblies. The central hub defines central hub bores therein. The plurality of coupler pins are received in the central hub bores and extend on one end into the first plurality of lobes and on a second end into the third plurality of lobes. The plurality of coupler pins compress the first and second side elastomeric inserts providing dampening between (i) the first side coupling body and the central hub and (ii) the second side coupling body and the central hub.

According to other features, the first series of passages have an oval shape and the first side elastomeric insert defines a series of openings having a circular shape. The second series of passages have an oval shape. The second side elastomeric insert defines a series of openings having a circular shape. The plurality of coupler pins are permitted to travel within the boundary of the oval passages in the first side coupling body while the first side elastomeric insert absorbs torsional loads. The plurality of coupler pins are permitted to travel within the boundary of the oval passages in the second side coupling body while the second side elastomeric insert absorbs torsional loads. The first and second side elastomeric inserts can be formed of HNBR. The first and second side coupling bodies are formed of one of PEEK and glass-filled molded nylon such as Nylon 46 with 30% glass fiber.

BRIEF DESCRIPTION OF THE DRAWINGS

The present disclosure will become more fully understood from the detailed description and the accompanying drawings, wherein.

DETAILED DESCRIPTION

Figure 1:
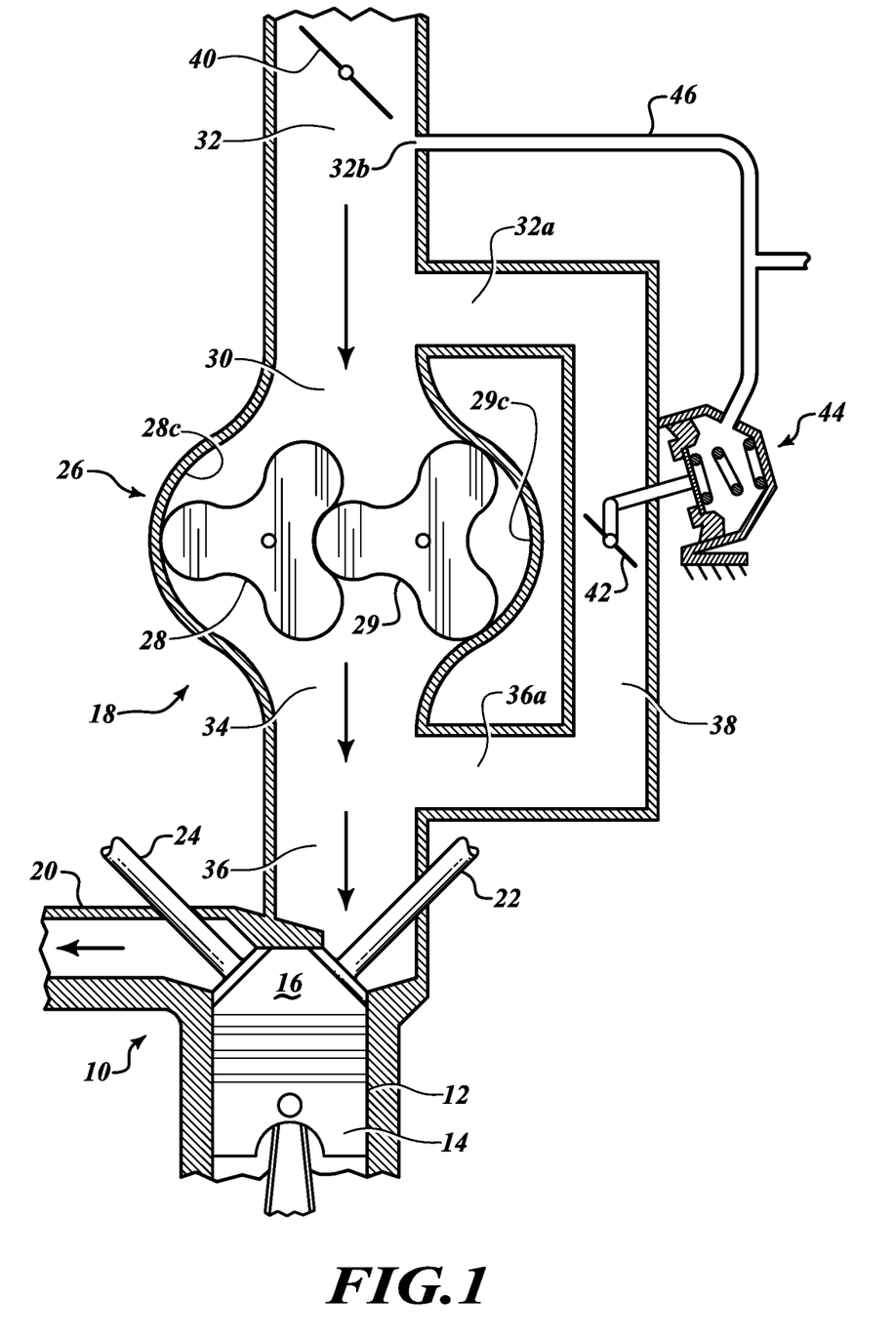
FIG. 1 is a schematic illustration of an intake manifold assembly having a positive displacement blower or supercharger constructed in accordance to one example of the present disclosure.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower 26, or supercharger of the Roots type. Further description of the rotary blower 26 may be found in commonly owned U.S. Pat. Nos. 5,078,583 and 5,893,355, which are expressly incorporated herein by reference. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively. The rotors 28 and 29 may be driven mechanically by engine crankshaft torque transmitted thereto in a known manner, such as by a drive belt (not specifically shown). The mechanical drive rotates the blower rotors 28 and 29 at a fixed ratio, relative to crankshaft speed, such that the displacement of the blower 26 is greater than the engine displacement, thereby boosting or supercharging the air flowing to the combustion chambers 16.

The blower 26 can include an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

Figure 2:
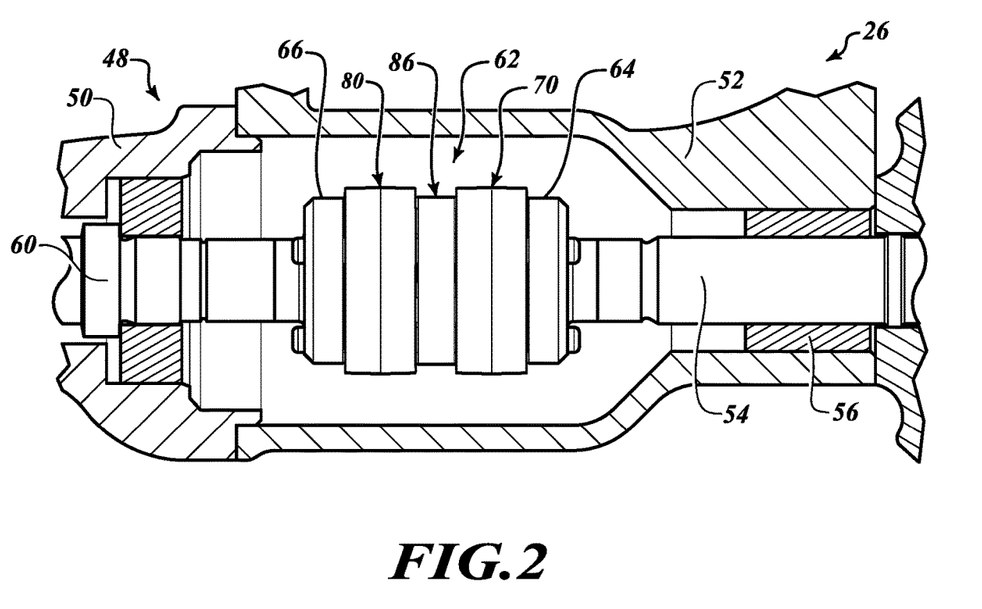
FIG. 2 is an enlarged, fragmentary, axial cross-section of the input section of the supercharger of FIG. 1 and having a coupling assembly used to couple an input shaft and a rotor shaft and constructed in accordance to one example of the present disclosure.
Figure 3:
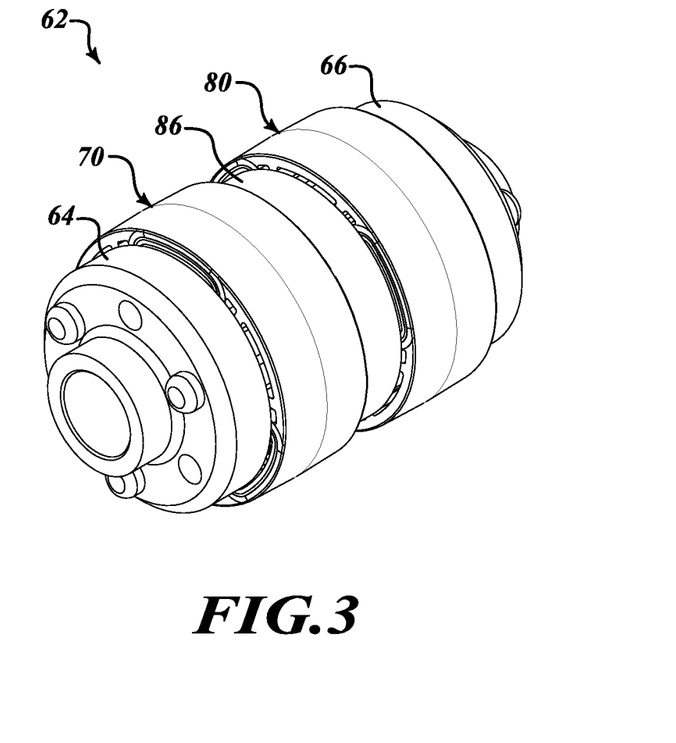
FIG. 3 is front perspective view of the coupling assembly of FIG. 2.

With specific reference now to FIG. 2, an input section 48 of the blower 26 is shown. The input section 48 can include a housing member 50, which forms a forward end of the chambers 28c and 29c. Attached to the housing member 50 is a forward housing 52 within which is disposed an input shaft 54. The input shaft 54 is supported within the forward housing 52 by at least one bearing 56. Rotatably supported by the housing member 50 is a rotor shaft 60, upon which is mounted the blower rotor 28 (see FIG. 1). A coupling assembly 62 couples the input shaft 54 to the rotor shaft 60. In one example, a first hub 64 can couple the input shaft 54 to the coupling assembly 62 on a first end and a second hub 66 can couple the rotor shaft 60 to the coupling assembly 62 on an opposite end. While not specifically shown, a first timing gear may be mounted on a forward end of the rotor shaft. The first timing gear may define teeth that are in meshed engagement with gear teeth of a second timing gear that is mounted on the second rotor shaft. The second rotor shaft would be in driving engagement with the blower rotor 29.

In one configuration, positive torque is transmitted from an internal combustion engine (of the periodic combustion type) to the input shaft 54 by any suitable drive means, such as a belt and pulley drive system (not shown herein). Torque is transmitted from the input shaft 54 to the rotor shaft 60 through the coupling assembly 62. The coupling assembly 62 of the present disclosure provides torsional damping and can further account for misalignment between the input shaft 54 and the rotor shaft 60. When the engine 10 is driving the timing gears and the blower rotors 28 and 29, such is considered to be transmission of positive torque. On the other hand, whenever the momentum of the rotors 28 and 29 overruns the input from the input shaft 54, such is considered to be the transmission of negative torque.

Figure 4:
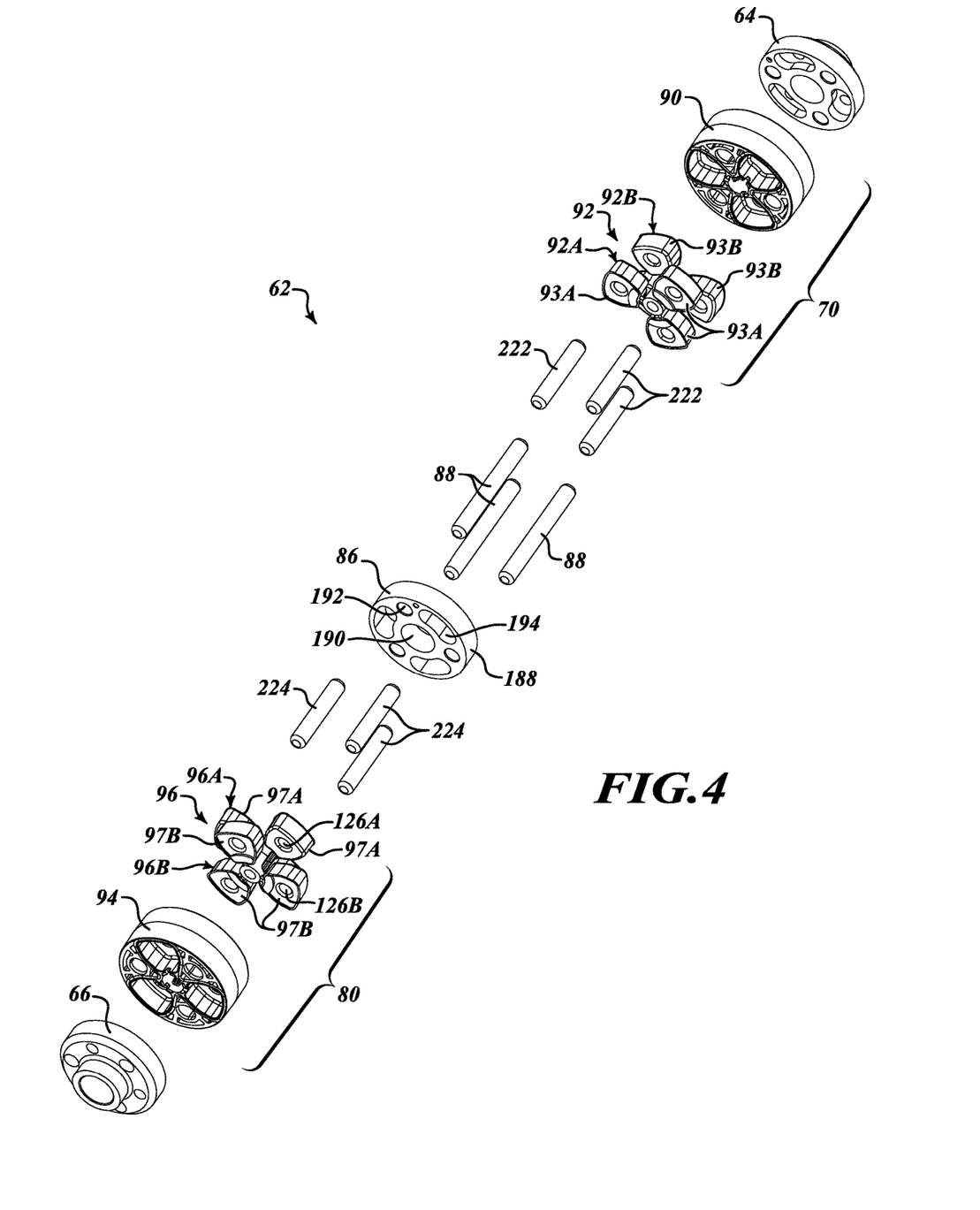
FIG. 4 is an exploded side view of the coupling assembly of FIG. 3.

With additional reference now to FIGS. 3-10, the coupling assembly 62 constructed in accordance to one example of the present disclosure will be described in greater detail. The coupling assembly 62 can generally include a first side coupling assembly 70, a second side coupling assembly 80, a central hub 86, and a plurality of coupler pins 88 (FIG. 4). The first side coupling assembly 70 can include a first side coupling body 90 and a first side elastomeric insert 92. As will be described with respect to FIGS. 6-8 and 10, the first side elastomeric insert 92 can collectively be defined by a first and a second tangentially offset cloverleaf members 92A and 92B. The first cloverleaf member 92A has a plurality of first lobes 93A. The second cloverleaf member 92B has a plurality of second lobes 93B. The lobes 93A are tangentially offset from the lobes 93B (see FIG. 10). The second side coupling assembly 80 can include a second side coupling body 94 and a second side elastomeric insert 96. The second side elastomeric insert 96 can collectively be defined by first and a second tangentially offset cloverleaf members 96A and 96B. The first cloverleaf member 96A has a plurality of third lobes 97A. The second cloverleaf member 96B has a plurality of fourth lobes 97B. In the example shown, the first and second coupling assemblies 70 and 80 are constructed similarly. All of the coupler pins 88 are also constructed similarly.

With particular reference now to FIGS. 4-8, the first side coupling assembly 70 will be described. The first side coupling body 90 generally includes an outboard body portion 100 and an inboard body portion 102. The first and second side coupling bodies 90 and 94 can have a cylindrical outer shape. In this regard, the outboard and inboard body portions 100 and 102 can have a cylindrical outer shape and be molded as a unitary component.

Figure 5:
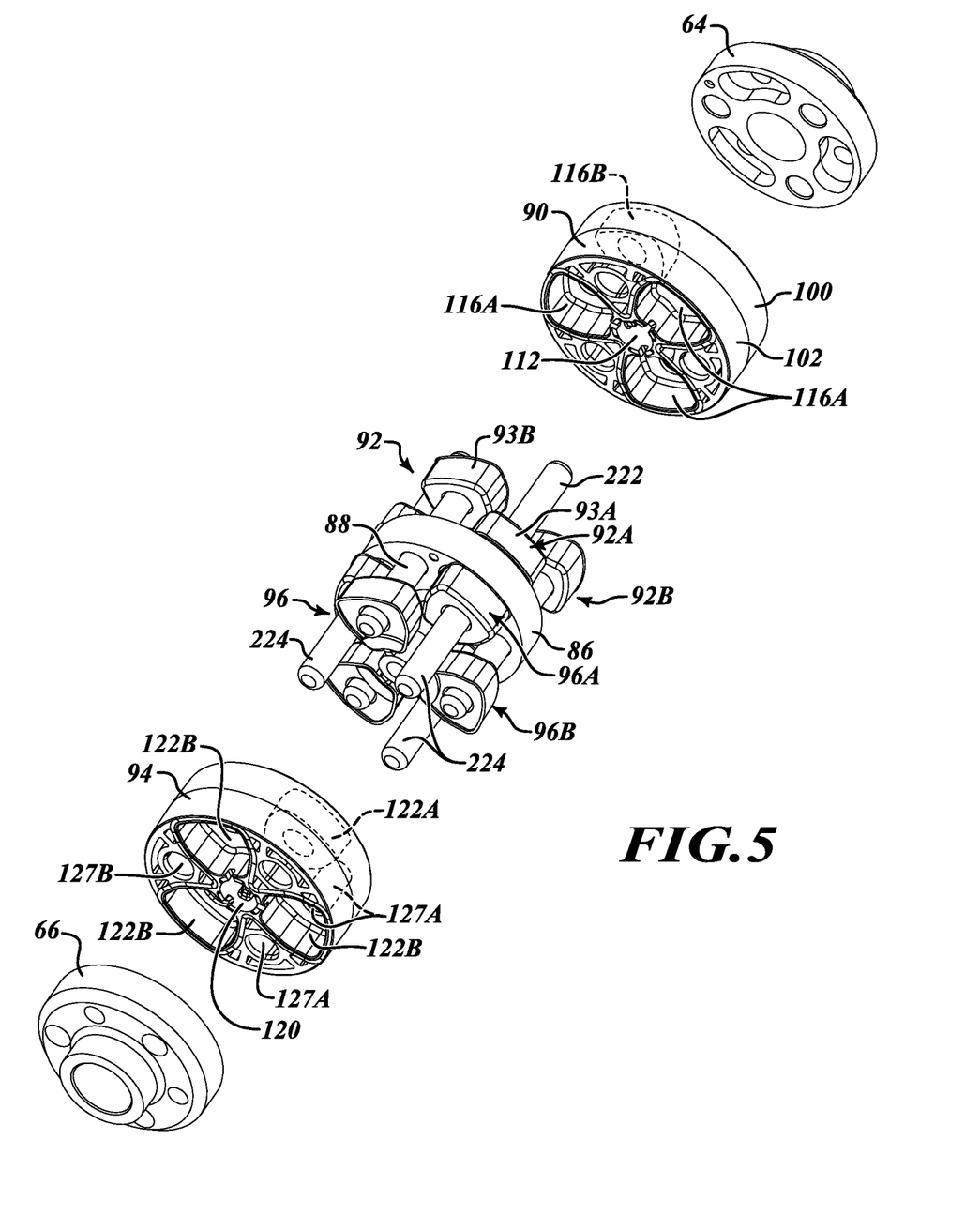
FIG. 5 is an exploded, partially assembled side view of the coupling assembly of FIG. 2.
Figure 6:
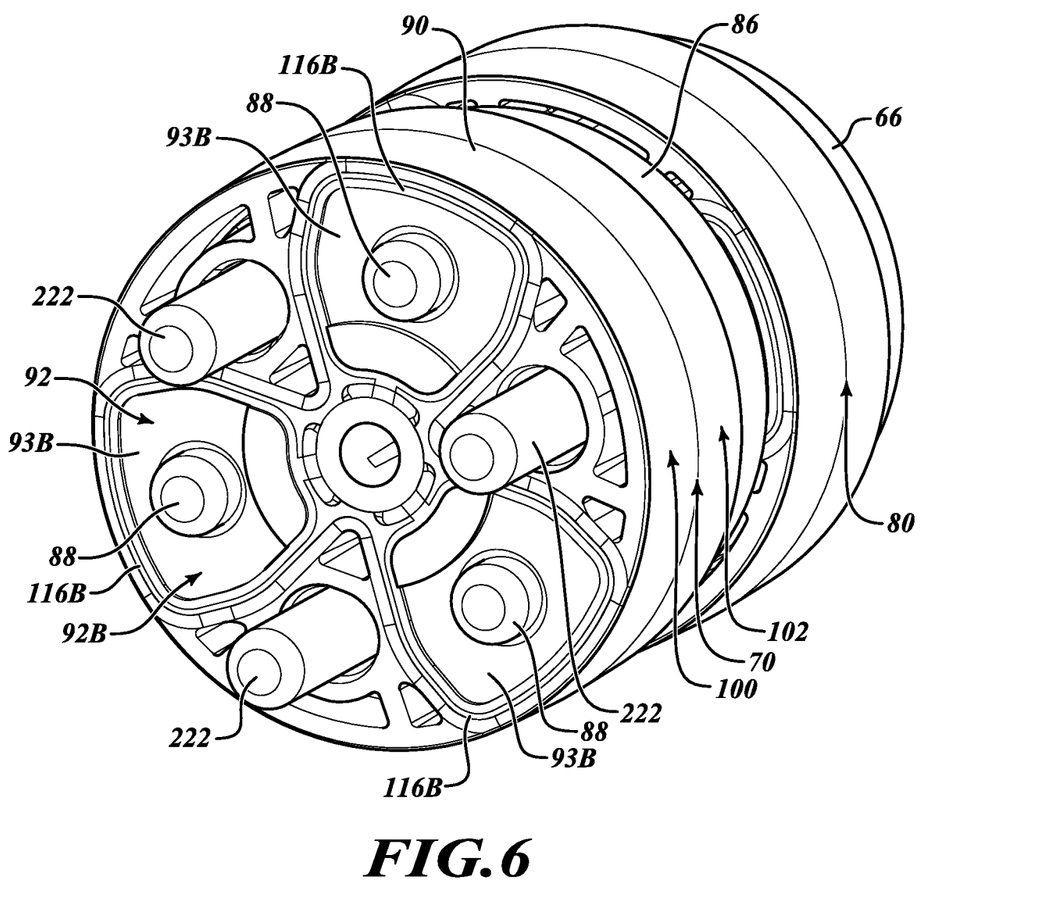
FIG. 6 is perspective view of the coupling assembly of FIG. 3 and shown with a first hub removed.
Figure 7:
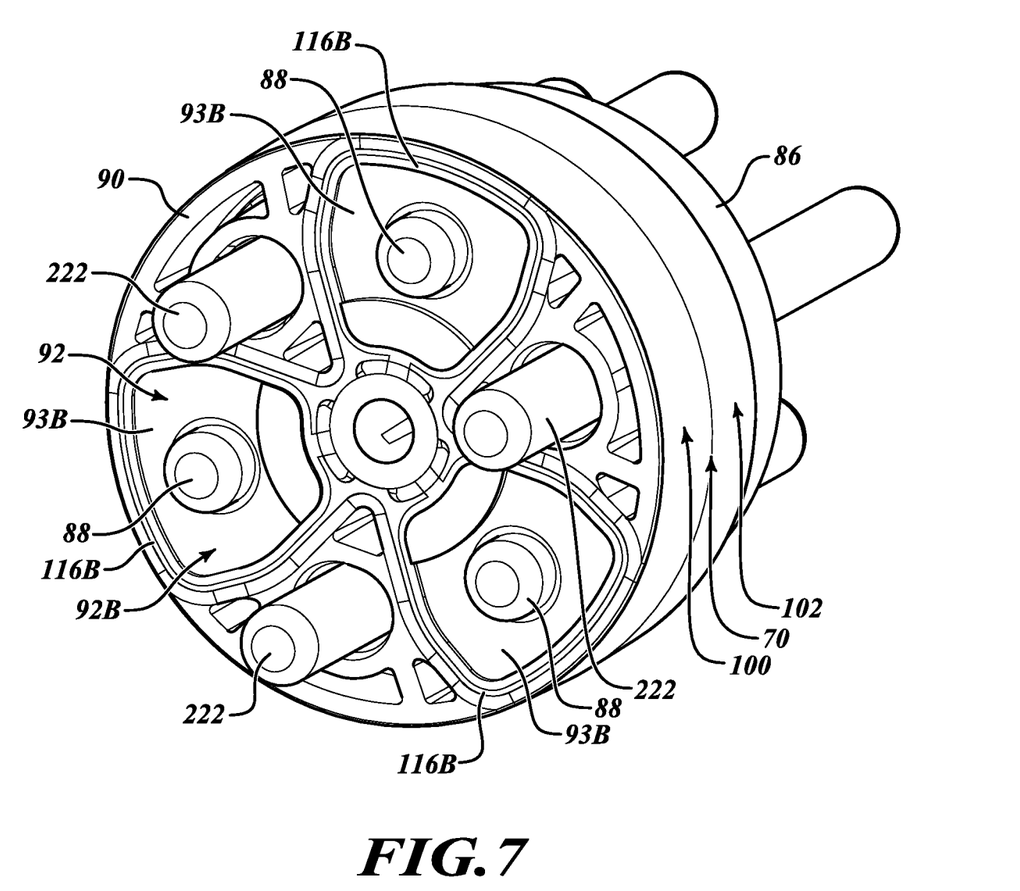
FIG. 7 is a perspective view of the first side coupling assembly, central hub, coupler pins and first hub pins.
Figure 8:
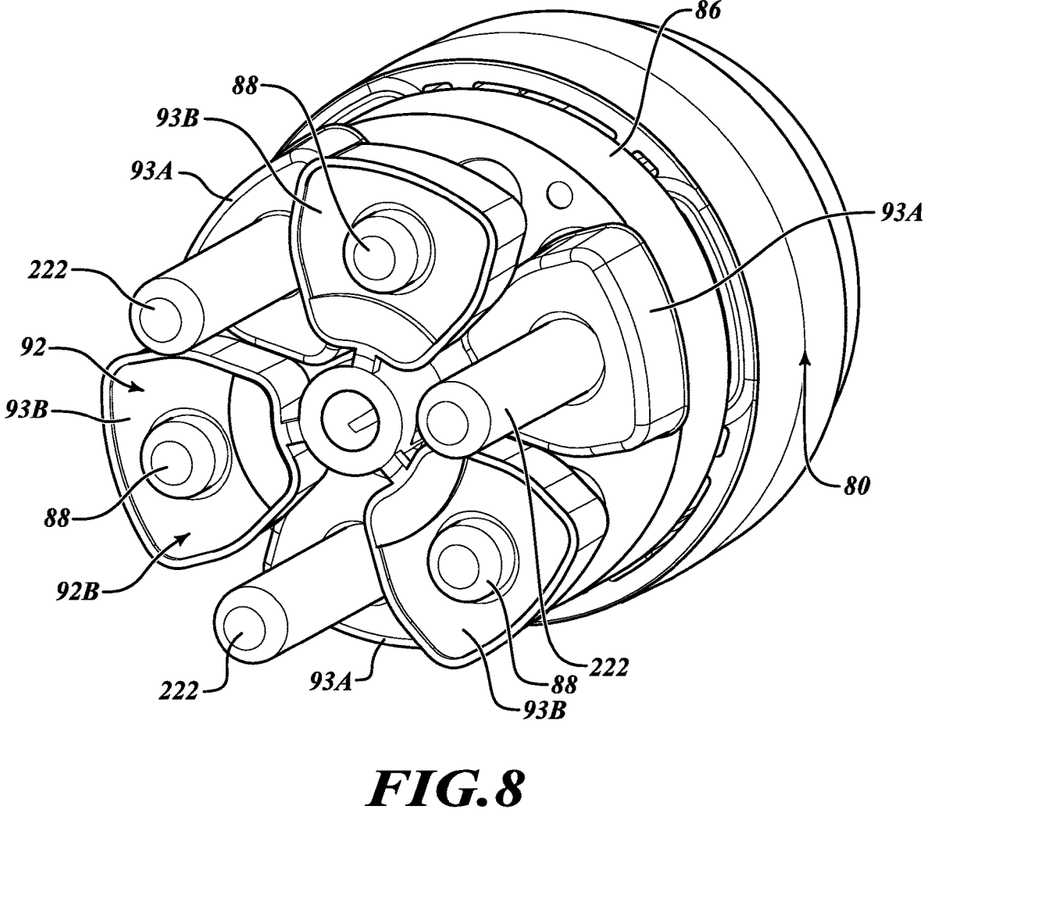
FIG. 8 is a perspective view of the coupling assembly of FIG. 6 and shown with the first hub removed and the first side coupling body removed.
Figure 9:
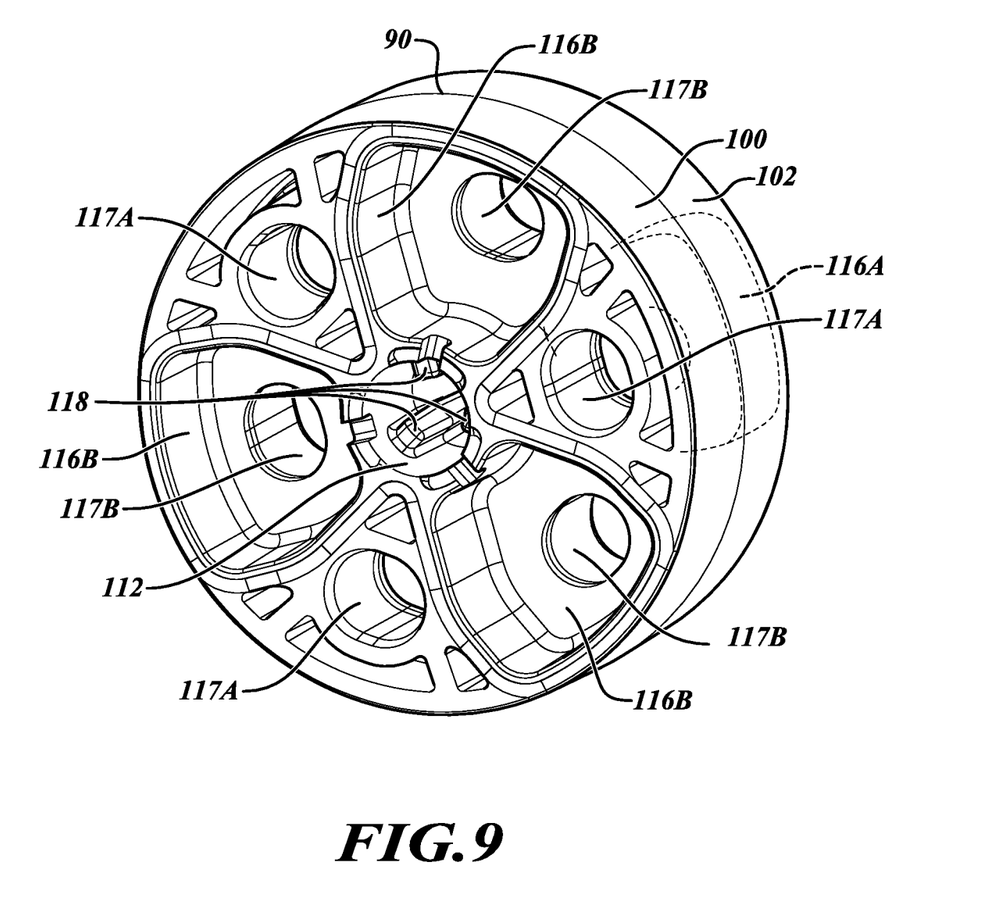
FIG. 9 is a perspective view of the first side coupling body.

With specific reference to FIGS. 5, 6 and 9, the first side coupling body 90 further defines a central bore 112, a first plurality of pockets or openings 116A, and a second plurality of pockets or openings 116B (FIG. 9). The first plurality of openings 116A (FIG. 5) are configured to accept the plurality of lobes 93A of the first cloverleaf member 92A of the first side elastomeric insert 92. Similarly, the second plurality of openings 116B (FIGS. 6 and 9) are configured to accept the plurality of lobes 93B of the second cloverleaf member 92B of the first side elastomeric insert 92. The openings 116A, 116B (FIG. 6) and respective lobes 93A, 93B accommodate radial translation of the respective coupler pins 88 extending from the central hub 86 and hub pins 222 (FIG. 4) extending from the first hub 64 (FIG. 4).

Passages 117A and 117B (FIG. 9) are defined through the first side coupling body 90. The passages 117A and 117B are oval or oblong to accommodate radial movement of the respective coupler pins 88 and hub pins 222. It will be appreciated that during movement of the pins 88 and 222 within the oblong openings 117A and 117B relative to the first side coupling body 90, the plurality of lobes 93A and 93B compress and provide dampening.

A plurality of tabs 118 (FIG. 9) can extend into the central bore 112. In one example, the tabs 118 can provide a gripping surface for a tool when removing components of the coupling assembly 62. While the example shown has three tabs, one, two or more than three may be provided. The first side coupling body 90 can be formed of any suitable lightweight durable material such as, but not limited to, Polyether ether ketone (PEEK) or glass-filled molded nylon such as Nylon 46 with 30% glass fiber.

Figure 10:
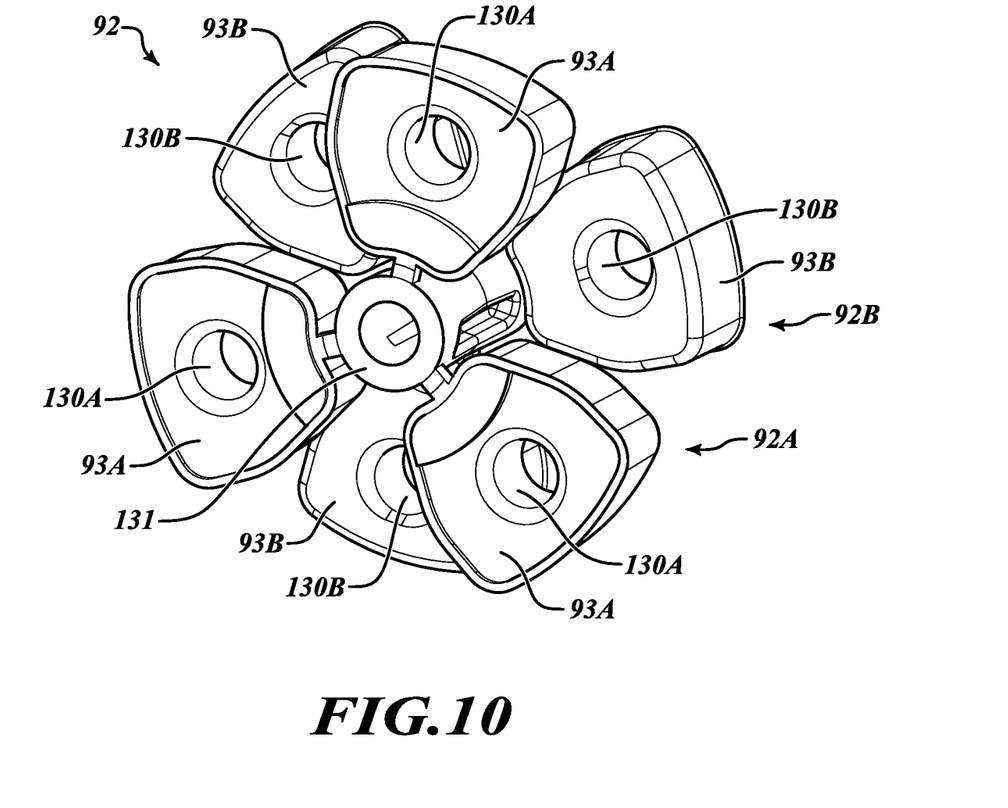
FIG. 10 is a perspective view of the first side coupling inserts.

With particular reference to FIG. 10, the first side elastomeric insert 92 has a series of pin openings 130A and 130B therein. The respective plurality of lobes 93A and 93B can extend from a central hub 131. The series of openings 130A can receive the pins 88 while the series of openings 130B can receive the pins 222. The series of openings 130A and 130B are cylindrical in shape. In this regard, the respective coupler pins 88 and hub pins 222 are permitted to travel within the boundary of the oval openings 117A, 117B while the coupler pins 88 and hub pins 222 compress the plurality of lobes 93A and 93B at the openings 130A, 130B to absorb torsional loads. In one example the first side elastomeric insert 92 can be formed of molded rubber such as hydrogenated nitrile butadiene rubber (HNBR).

The second side coupling assembly 80 can be constructed similarly to the first side coupling assembly 70. In one configuration the first and second side coupling assemblies 70 and 80 can be identical. The second side coupling body 94 further defines a central bore 120 (FIG. 5), a third plurality of pockets or openings 122A and a fourth plurality of pockets or openings 122B. The third plurality of openings 122A are configured to accept the plurality of lobes 97A of the first cloverleaf member 96A of the second side elastomeric insert 96. Similarly, the fourth plurality of openings 122B are configured to accept the plurality of lobes 97B of the second cloverleaf member 96B of the second side elastomeric insert 96. The coupler pins 88 and hub pins 242 are permitted to travel within the boundaries of oval passages 127B and 127A, respectively (FIG. 5). The openings 122A, 122B and respective lobes 96A, 96B accommodate radial translation of the respective coupler pins 88 extending from the central hub 86 and hub pins 224 (FIGS. 4 and 5) extending from the second hub 66 (FIG. 4). As shown in FIG. 4, the second side elastomeric assembly 96 has a series of pin openings 126A and 126B therein. It will be appreciated that during movement of the pins 88 and 224 within oblong openings 127A and 127B relative to the second side coupling body 94, the plurality of lobes 97A and 97B compress at the pin openings 126A and 126B to absorb torsional load and provide dampening.

The second side coupling body 94 can be formed of any suitable lightweight durable material such as, but not limited to, PEEK or glass-filled molded nylon such as Nylon 46 with 30% glass fiber. The second side elastomeric insert 96 can be formed of molded rubber such as HNBR.

As will become appreciated from the following discussion, the coupler pins 88 can bear against the surfaces defined by the openings 130B and 126B of the respective first and second elastomeric inserts 92 and 96. The elastomeric material of the first and second elastomeric inserts 92 and 96 can absorb the rotational energy from the coupler pins 88 during operation of the rotary blower 26 to provide dampening. Additionally, the hub pins 222 and 242 are also (alternately with the coupler pins 88) received by the openings 130A and 126A of the respective first and second elastomeric inserts 92 and 134. The elastomeric material of the first and second elastomeric inserts 92 and 96 can absorb the rotational energy from the hub pins 222 and 242 during operation of the rotary blower 26 to provide dampening.

With particular reference to FIG. 4, the central hub 86 includes a central hub body 188 having central bore 190, a series of alternately arranged bores 192 and arcuate passages 194. The central hub 86 can be formed of steel. The bores 192 can be configured to receive the coupler pins 88. The arcuate passages 194 can be configured to accommodate hub pins 222 and 242 associated with the first and second hubs 64 and 66.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A coupling assembly arranged between an input shaft and a rotor shaft of a supercharger, the coupling assembly comprising:
    a first hub mounted for concurrent rotation with the input shaft;
    a second hub mounted for concurrent rotation with the rotor shaft;
    a first side coupling assembly having (i) a first side coupling body and (ii) a first side elastomeric insert, the first side coupling body including an inboard body portion and an outboard body portion, the inboard body portion having a first series of pockets, the outboard body portion having a second series of pockets, the first side elastomeric insert having a first and second plurality of lobes, the pockets of the first and second series of pockets being tangentially offset relative to each other and each receiving respective first and second plurality of lobes therein;
    a second side coupling assembly having (i) a second side coupling body and (ii) a second side elastomeric insert, the second side coupling body including an inboard body portion and an outboard body portion, the inboard body portion having a third series of pockets, the outboard body portion having a fourth series of pockets, the second side elastomeric insert having a third and fourth plurality of lobes, the pockets of the third and fourth series of pockets being tangentially offset relative to each other and each receiving respective third and fourth lobes therein;
    a central hub disposed intermediate the first and second side coupling assemblies, the central hub defining central hub bores therein; and
    a plurality of coupler pins received in the central hub bores and extending on one end into the first plurality of lobes and on a second end into the third plurality of lobes;
    wherein the first and second side elastomeric inserts provide dampening between (i) the first side coupling body and the central hub and (ii) the second side coupling body and the central hub.

2. The coupling assembly of claim 1 wherein the first hub is configured to couple between the input shaft and the first side coupling assembly, the first hub having a first plurality of hub pins extending therefrom and wherein the second hub is configured to couple between the rotor shaft and the second side coupling assembly, the second hub having a second plurality of hub pins extending therefrom.

3. The coupling assembly of claim 2 wherein the central hub further defines arcuate passages formed therein configured to at least partially receive the first hub pins and the second hub pins.

4. The coupling assembly of claim 3 wherein the first side coupling body defines a plurality of passages having an oval shape and the first side elastomeric insert defines a plurality of openings having a circular shape.

5. The coupling assembly of claim 4 wherein the second side coupling body defines a plurality of passages having an oval shape and the second side elastomeric insert defines a plurality of openings having a circular shape.

6. The coupling assembly of claim 5 wherein the plurality of coupler pins and the first plurality of hub pins are permitted to travel within the boundary of the oval passages in the first side coupling body while the first side elastomeric insert absorbs torsional loads.

7. The coupling assembly of claim 6 wherein the plurality of coupler pins and the second plurality of hub pins are permitted to travel within the boundary of the oval passages in the second side coupling body while the second side elastomeric insert absorbs torsional loads.

8. The coupling assembly of claim 7 wherein the first and second side elastomeric inserts are formed of molded rubber.

9. The coupling assembly of claim 8 wherein the first and second side elastomeric inserts are formed of hydrogenated nitrile butadiene rubber (HNBR).

10. The coupling assembly of claim 8 wherein the first and second side coupling bodies are formed of one of Polyether ether ketone (PEEK) and glass-filled molded nylon.

11. A coupling assembly arranged between an input shaft and a rotor shaft of a supercharger, the coupling assembly comprising:
    a first side coupling assembly having (i) a first side coupling body and (ii) a first side elastomeric insert, the first side coupling body including an inboard body portion and an outboard body portion, the inboard body portion having a first series of pockets and a first series of passages, the outboard body portion having a second series of pockets and a second series of passages, the first side elastomeric insert having a first and second plurality of lobes, the pockets of the first and second series of pockets being tangentially offset relative to each other and each receiving respective first and second plurality of lobes therein;

a second side coupling assembly having (i) a second side coupling body and (ii) a second side elastomeric insert, the second side coupling body including an inboard body portion and an outboard body portion, the inboard body portion having a third series of pockets and a third series of passages, the outboard body portion having a fourth series of pockets and a fourth series of passages, the second side elastomeric insert having a third and fourth plurality of lobes, the pockets of the third and fourth series of pockets being tangentially offset relative to each other and each receiving respective third and fourth lobes therein;

a central hub disposed intermediate the first and second side coupling assemblies, the central hub defining central hub bores therein; and a plurality of coupler pins received in the central hub bores and extending on one end through the first series of passages and into the first plurality of lobes and on a second end through the third series of passages into the third plurality of lobes;

wherein the plurality of coupler pins compress the first and second side elastomeric inserts provide dampening between (i) the first side coupling body and the central hub and (ii) the second side coupling body and the central hub.

12. The coupling assembly of claim 11 wherein the first series of passages have an oval shape and the first side elastomeric insert defines a series of openings having a circular shape.

13. The coupling assembly of claim 12 wherein the second series of passages have an oval shape and the second side elastomeric insert defines a series of openings having a circular shape.

14. The coupling assembly of claim 13 wherein the plurality of coupler pins are permitted to travel within the boundary of the oval passages in the first side coupling body while the first side elastomeric insert absorbs torsional loads.

15. The coupling assembly of claim 14 wherein the plurality of coupler pins are permitted to travel within the boundary of the oval passages in the second side coupling body while the second side elastomeric insert absorbs torsional loads.

16. The coupling assembly of claim 11 wherein the first and second side elastomeric inserts are formed of molded rubber.

17. The coupling assembly of claim 16 wherein the first and second side elastomeric inserts are formed of hydrogenated nitrile butadiene rubber (HNBR).

18. The coupling assembly of claim 16 wherein the first and second side coupling bodies are formed of one of Polyether ether ketone (PEEK) and glass-filled molded nylon.

19. The coupling assembly of claim 11 wherein the central hub comprises a plurality of tabs extending into a central bore thereof, the plurality of tabs configured to provide a gripping surface for a tool.

20. The coupling assembly of claim 11 wherein the first and second plurality of lobes of the first side elastomeric insert and the third and fourth plurality of lobes of the second side elastomeric insert comprise tangentially offset first and second cloverleaf members.

* * * * *